United States Patent [19]
Bartel et al.

[11] 4,376,492
[45] Mar. 15, 1983

[54] CLOSURE MEMBER FOR THE FUEL TANK OF AN AUTOMOTIVE VEHICLE

[75] Inventors: Günter Bartel; Horst Fiedler, both of Stuttgart; Manfred Stotz, Aichwald; Einhard Kleinschmit, Esslingen, all of Fed. Rep. of Germany

[73] Assignee: Daimler-Benz A.G., Stuttgart, Fed. Rep. of Germany

[21] Appl. No.: 172,438

[22] Filed: Jul. 25, 1980

[30] Foreign Application Priority Data

Jul. 25, 1979 [DE] Fed. Rep. of Germany ....... 2930133

[51] Int. Cl.³ ............................................. B65D 55/14
[52] U.S. Cl. ...................................... 220/210; 70/165; 220/86 AT; 220/293
[58] Field of Search ................. 70/165, 170, 171, 172; 220/210, 293, 86 AT

[56] References Cited

U.S. PATENT DOCUMENTS 1,997,107  4/1935  Cullinan .......................... 220/210 X

FOREIGN PATENT DOCUMENTS 1134303  8/1962  Fed. Rep. of Germany ...... 220/210
2216483  10/1973  Fed. Rep. of Germany ...... 220/210
1262388  4/1961  France ................................. 70/165

Primary Examiner—Allan N. Shoap
Attorney, Agent, or Firm—Paul M. Craig, Jr.

[57] ABSTRACT

A tank closure mechanism, especially for a fuel tank of an automotive vehicle, with a locking tube pertaining to the cap proper and including a pressure plate and a gasket. The locking tube is rotatable by rotating the cap housing during locking operation of the cap by a latch of a lock cylinder but remains stationary after an unlocking during a rotation of the cap housing. A clamping ring exerting a tightening clamp is rotatable together with the locking tube. A compression spring of a bayonet catch presses against the clamping ring with the spring being supported on the cap and the pressure plate. The locking tube and pressure plate are fashioned so as to be bi-partite and the pressure plate extends over the locking tube with a sliding fit or the like.

23 Claims, 2 Drawing Figures

CLOSURE MEMBER FOR THE FUEL TANK OF AN AUTOMOTIVE VEHICLE

The present invention relates to a cap or closure member and, more particularly, to a cap or closure member for a fuel tank of an automotive vehicle which includes a locking tube associated with the cap proper, a pressure plate and a gasket. The locking tube is adapted to be rotatable by rotating the cap housing during a locking operation of the cap by a latch or interlock means but remain stationary after an unlocking during the rotation of the cap housing. A clamping ring, exhibiting a tightened clamp, is rotatable together with the locking tube, with a compression spring of a bayonet catch pressing against the clamping ring and being supported at the other end on the cap.

In proposed tank closures, the tensioning force of the compression spring is so great that the gasket of the tank closure is urged with a contact force of about 12 Newton against the closure socket of a tank filler nipple or opening. In some cases this contact force may be too small to provide a secure seal between the sealing ring and the closure socket at certain prevailing conditions; however, in other cases this contact force may be too great because intolerably high forces would be required to overcome the friction between the sealing ring and the closure cap to open the tank.

The aim underlying the present invention essentially resides in providing a tank closure mechanism for a fuel tank of a motor vehicle which improves a possible poor seal by increasing the contact pressure and yet reduces the force required for an opening of the tank closure.

In accordance with advantageous features of the present invention, the locking tube and pressure plate of the tank closure are of a bi-partite construction, and the pressure plate extends over the locking tube with a sliding fit or the like. To seal the sliding fit surfaces, an annular groove may be provided in the pressure plate or in the locking tube or in both the pressure plate and the locking tube with a sealing ring being inserted into such groove. The sealing ring seals the parting surfaces between the pressure plate and the locking tube. A concomitant rotation of the clamping ring, necessary for a functioning of the bayonet catch, is achieved by providing that the clamping ring is rotatable through the locking tube by the cap housing if the latter is locked together with the locking tube because a corresponding tongue at the clamping ring engages into at least one groove in the locking tube.

Since it would be possible, while vigrously compressing the compression spring of the tank closure mechanism, to lift the cap housing to such an extent that with the use of a screw driver or similar tool one could obtain access to the clamping ring between the gasket and sealing cap, and could rotate the clamping ring to thereby open the tank closure, in accordance with further features of the present invention, special measures are proposed so as to result in a safety device protecting against theft. The possibility of attaining access by a gasoline theft or the like is prevented by arranging a collar having the shape of a cylindrical ring at the pressure plate. The collar extends beneath the top rim of the closure socket to such an extent that its extension of total length is greater than the sum total of the individual coil spacings of the compression spring resulting when the tank closure has been placed on the closure socket and locked in position. By virtue of this arrangement, when the housing cap is lifted as far as maximally possible, namely, when the individual spring windings of the compression spring are in mutual contact, the collar on the pressure plate will still extend beneath the face of the closure socket in the space between the latter and the clamping ring so that access to the clamping ring is not possible.

To increase the sealing power, the compression spring of the present invention is constructed and designed so that a contact force is provided between the gasket and closure socket which is greater than 12 Newton. However, in spite of this large contact force, the cap may nevertheless be readily opened because the gasket, with its high coefficient of friction, is not turned during the opening of the tank closure and rests without movement on its two contact surfaces, namely, on the pressure plate and on the closure socket.

In accordance with the present invention, the clamping ring is rotatable by way of the locking tube by the cap housing if the cap housing is locked together with the locking tube because a corresponding tongue provided at the clamping ring engages into at least one groove in the locking tube.

Accordingly, it is an object of the present invention to provide a tank closure mechanism for a tank of a motor vehicle, especially a fuel tank, which avoids, by simple means, shortcomings and disadvantages encountered in the prior art.

Another object of the present invention resides in providing a tank closure mechanism for a tank of a motor vehicle which ensures the existence of a sufficient contact force so as to provide a secure seal but which does not increase the force required for removal of the tank closure mechanism.

Yet another object of the present invention resides in providing a tank closure mechanism for a tank of a motor vehicle which prevents unauthorized access to the tank.

A further object of the present invention resides in providing a tank closure mechanism for a tank of a motor vehicle which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein.

Figure 1:
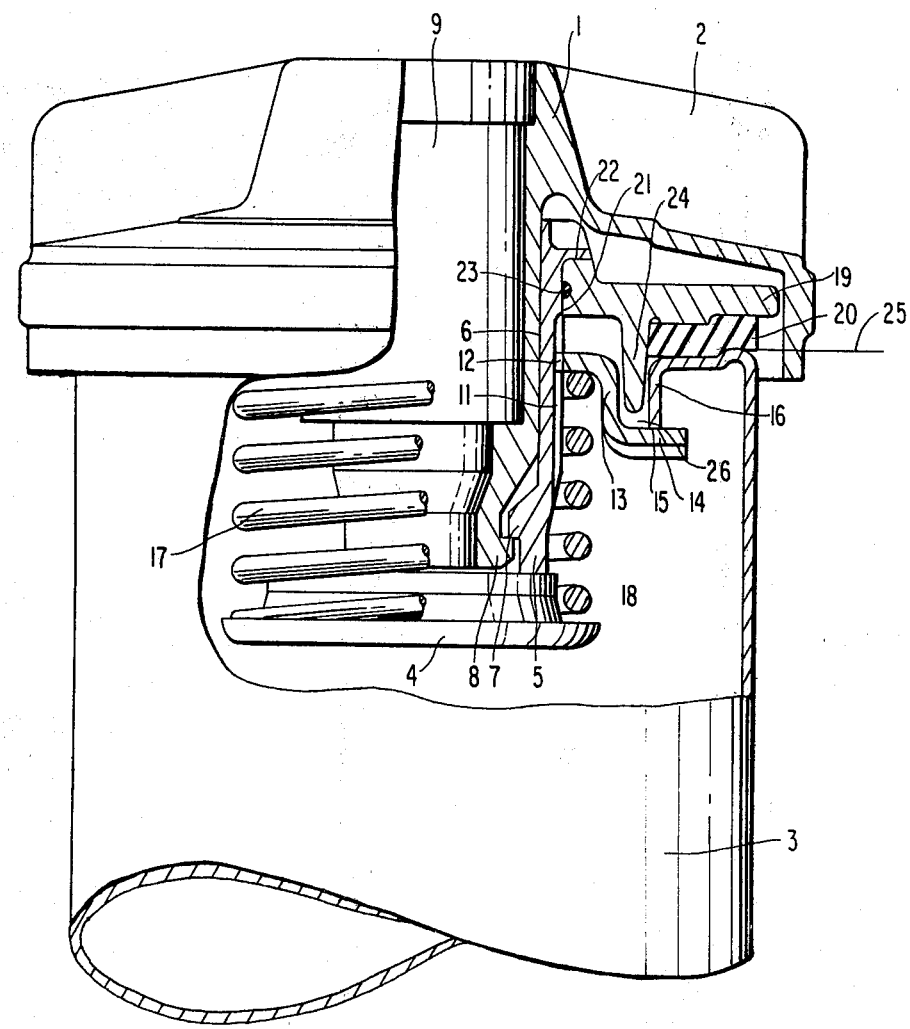
FIG. 1 is a partial cross sectional view of a tank closure mechanism in accordance with the present invention.

Referring now to FIG. 1 of the drawing, according to this figure, the tank closure mechanism includes a cap housing 1 provided with a handle web 2, which serves for enabling a rotating of the cap housing 1 during the opening and closing of a closure socket 3 of a tank filler pipe.

A locking tube is associated with the cap 4 proper with the tube 5 being connected to the cap 4. The cap housing 1 and the locking tube 5 are provided with cylindrical surfaces 6 of an identical diameter with such a tolerance width that the cylindrical surface 6 of the cap housing 1 and the locking tube 5 may be placed one on the other with a sliding fit.

After the locking tube 5 has been pushed onto the cap housing 1 to a sufficiently large extent, projecting lugs 7 provided on the locking tube 5 interlock with an annular shoulder 8 provided on the cap housing 1. Thereafter, the locking tube 5 may only be rotated with respect to the cap housing 1. In order to eliminate the rotatability between the cap housing 1 and the locking tube 5, a key operated lock cylinder 9 is provided whereby, upon insertion of the key, a bolt (not shown) may be advanced from the cap housing 1 so as to engage into recesses provided in the locking tube 5. After the locking between the locking tube 5 and cap housing 1 is accomplished by the lock cylinder 9, the locking tube 5 may then always be rotated with the cap housing 1 by rotating the cap housing 1 through the handle web 2.

A plurality of grooves 11 are arranged along the outer circumference of the locking tube 5 and a clamping ring 13 is provided which includes tongue portions 12 adapted to slide into the grooves 11. The clamping ring 13 includes two tightening clamps 14 which are diametrically opposed to each other. The tightening clamps 14, when the tank closure is placed on the closure socket 3, first extend through two slots and then, with inclined abutment surfaces, are brought into a position shown in the drawing by rotation of the cap housing 1, wherein the tightening clamps 14 contact a lower edge 15 of an inner wall 16 of the closure socket 3.

A compression spring 17 supported on the clamping ring 13 and on a projecting shoulder 18 of the cap 4 surrounds the cap 4 and urges the tightening clamp 14 against the lower edge 15 of the inner wall 16 of the closure socket 3.

Figure 2:
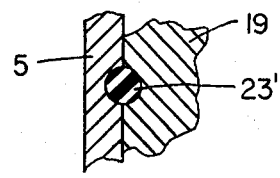
FIG. 2 shows a second embodiment of a sealing configuration for the locking tube and pressure plate.

A pressure plate 19, carrying a sealing disc 20, which heretofore had been produced integrally with the locking tube 5, is, in accordance with the present invention, provided separately from the locking tube. As shown in the drawing, the pressure plate 19 extends over the surface 21 of the locking tube 5 with a sliding fit and otherwise contacts a continuously extending projection 22 of the locking tube 5. The surface 21 is sealed by, for example, a sealing ring 23, FIG. 1, which forms a radial seal and is inserted in a corresponding groove provided in the pressure plate 19, or in grooves in both locking tube 5 and pressure plate 19 as shown at 23' in FIG. 2. As can readily be appreciated, the sealing ring 23 may also be arranged between a top side of the pressure plate 19 and the continuously extending projection 22 so as to obtain an axial seal.

A cylindrical collar 24 is provided on the pressure plate 19, with the collar 24 projecting downwardly beneath a top edge 25 of the closure socket 3 to such an extent that the total length of the collar 24 or the distance the collar 24 extends downwardly of the pressure plate 19 is greater than a sum of the total of the individual spacings between the windings of the compression spring 17, resulting when the compression spring 17, as shown in the single figure of the drawing, has been placed on the closure socket 3 and locked in position. The cylindrical collar 24 projects into a space 26 disposed between an inner surface of an inner wall 16 of the closure socket 5 and an outer surface of the clamping ring 13 and the tightening clamp 14.

With the cylindrical collar 24, if the cap housing 1 is now lifted upwardly as far as possible, that is, to such an extent that the individual windings of the compression spring 17 are in close juxtaposition, by virtue of the length of the collar 24, the collar is of sufficient length in a downward direction that its lower end is still disposed beneath a top rim 25 of the closure socket 3 so that it is impossible to introduce a tool or the like from outside of the closure socket 3 in order to attempt to rotate the clamping ring 13 with the tightening clamp 14 to such a degree that the cap may be opened. This feature is important especially in the instant situation because, due to the fact that the gasket 20 contacting the pressure plate 19 and the collar 24 remains stationary, only a minor amount of friction force, namely between the sealing ring 23 and the locking tube 5, must be overcome in order to rotate the tightening clamp 14. For this reason, it is also possible to assign a higher contact force to the spring which, for sealing reasons, preferably is larger than 12 Newton.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A closure mechanism for a tank, the mechanism comprising a cap housing, a locking tube associated with the cap housing so as to be rotatable relative thereto, a cap means disposed opposite the cap housing and associated with the locking tube, a pressure plate associated with the locking tube, means for selectively connecting the cap housing with the locking tube so as to enable the locking tube to rotate with the cap housing, and a clamping ring means associated with the locking tube so as to be rotatable therewith and to enable a locking and unlocking of the closure mechanism on a filler opening of the tank, characterized in that the locking tube and pressure plate are formed as two separate members, the pressure plate surrounds the locking tube and is mounted thereon with a sliding fit, and in that sealing means are provided for sealing separating surfaces between the locking tube and the pressure plate, said closure mechanism allowing said locking and unlocking on the filler opening of the tank without movement of said pressure plate with said locking tube being necessary.

2. A closure mechanism according to claim 1, characterized in that a compression spring is interposed between the cap means and the clamping ring means with one end of the compression spring means being supported by the cap means and the other end of the compression spring means being supported at the clamping ring means.

3. A closure mechanism according to claim 2, characterized in that the means for selectively connecting the cap housing to the locking tube is a lock cylinder means adapted to lock the cap housing to the locking tube when the lock cylinder means is in a locking condition and to permit the lock tube to remain stationary relative to the cap housing when the lock cylinder means is in an unlocked condition.

4. A closure mechanism according to claim 3, characterized in that the clamping ring means includes a tightening clamp adapted to cooperate with the filler opening so as to clamp the closure mechanism at the filler opening.

5. A closure mechanism according to claim 4, characterized in that a gasket means is mounted on the pressure plate and is cooperable with a portion of the filler opening to seal the closure mechanism.

6. A closure mechanism according to one of claims 1 or 5, characterized in that the tank is a fuel tank of a motor vehicle.

7. A closure mechanism according to claim 5, characterized in that the compression spring means urges the pressure plate and gasket means against a sealing surface of the filler opening when the closure mechanism is in a locked position with a contact force of at least 12 Newton.

8. A closure mechanism according one of claims 1 or 5, characterized in that said sealing means includes a ring seal interposed between the separating surfaces of the locking tube and pressure plate.

9. A closure mechanism according to claim 8, characterized in that an annular groove is provided in the separating surface of at least one of the locking tube and pressure plate for accommodating the ring seal.

10. A closure mechanism according to claim 8, characterized in that an annular groove is provided in the separating surface of both the locking tube and pressure plate for accommodating the ring seal.

11. A closure mechanism according to claim 8, characterized in that the clamping ring means includes a means for engaging the locking tube so as to enable a rotation of the clamping ring means with the locking tube.

12. A closure mechanism according to claim 11, characterized in that said engaging means are tongue means provided on the clamping ring means.

13. A closure mechanism according to claim 12, characterized in that at least one groove means is provided in the locking tube for accommodating said tongue means of the clamping ring means.

14. A closure mechanism according to claim 12, characterized in that means are provided for preventing unauthorized access to the filler opening.

15. A closure mechanism according to claim 14, characterized in that said means for preventing unauthorized access includes a collar portion provided on the pressure plate and extending downwardly therefrom to a point beyond a top edge of the filler opening, said collar portion has an axial length which is greater than a sum of individual distances between windings of the compression spring means resulting when the closure mechanism is disposed at the filler opening and locked in position.

16. A closure mechanism according to claim 15, characterized in that the collar portion is shaped as a cylindrical ring and extends into a space between an inner wall of the filler opening and an outer surface of the clamping ring means.

17. A closure mechanism according to claim 16, characterized in that the compression spring means urges the pressure plate in a direction of a sealing surface of the filler opening when the closure mechanism is in a locked position with a contact force of at least 12 Newton.

18. A closure mechanism according to one of claims 1 or 5, characterized in that the clamping ring means includes a means for engaging the locking tube so as to enable a rotation of the clamping ring means with the locking tube.

19. A closure mechanism according to claim 18, characterized in that said engaging means are tongue means provided on the clamping ring means.

20. A closure mechanism according to claim 19, characterized in that at least one groove means is provided in the locking tube for accommodating said tongue means of the clamping ring means.

21. A closure mechanism according to one of claims 1 or 5, characterized in that means are provided for preventing unauthorized access to the filler opening.

22. A closure mechanism according to claim 21, characterized in that said means for preventing unauthorized access includes a collar portion provided on the pressure plate and extending downwardly therefrom to a point beyond a top edge of the filler opening, said collar portion has an axial length which is greater than a total of a sum of individual distances of windings of the compression spring means resulting when the closure mechanism is disposed at the filler opening and locked in position.

23. A closure mechanism according to claim 22, characterized in that the collar portion is shaped as a cylindrical ring and extends into a space between an inner wall of the filler opening and outer surface of the clamping ring means.

* * * * *